(12) United States Patent
Chen

(10) Patent No.: US 9,013,821 B1
(45) Date of Patent: Apr. 21, 2015

(54) DATA STORAGE DEVICE EMPLOYING ONE-DIMENSIONAL AND TWO-DIMENSIONAL CHANNELS

(71) Applicant: Western Digital Technologies, Inc., Irvine, CA (US)

(72) Inventor: Yiming Chen, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/301,326

(22) Filed: Jun. 10, 2014

(51) Int. Cl.
*G11B 5/035* (2006.01)
*G11B 20/10* (2006.01)

(52) U.S. Cl.
CPC .................. *G11B 20/10046* (2013.01)

(58) Field of Classification Search
None
See application file for complete search history.

(56) References Cited

U.S. PATENT DOCUMENTS

| | | | |
|---|---|---|---|
| 5,151,891 A * | 9/1992 | Bergmans | 369/59.21 |
| 5,229,901 A | 7/1993 | Mallary | |
| 5,347,509 A * | 9/1994 | Goldberg et al. | 369/59.21 |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,154,335 A | 11/2000 | Smith et al. | |
| 6,157,510 A | 12/2000 | Schreck et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,278,568 B1 | 8/2001 | Cloke et al. | |

(Continued)

OTHER PUBLICATIONS

Alvin J. Wang, et al., U.S. Appl. No. 14/089,912, filed Nov. 26, 2013, 19 pages.

(Continued)

*Primary Examiner* — Peter Vincent Agustin

(57) ABSTRACT

A data storage device is disclosed comprising a disk comprising a plurality of data tracks. A first data track is read to generate a first read signal that is sampled to generate first signal samples. A second data track adjacent the first data track is read to generate a second read signal that is sampled to generate second signal samples. The first signal samples and the second signal samples are processed by a first two-dimensional (2D) to one-dimensional (1D) equalizer to generate a first 1D sequence of equalized samples, and by a 2D-to-2D equalizer to generate a 2D sequence of equalized samples. The first 1D sequence of equalized samples are processed using a first 1D detector to detect a first estimated data sequence, and the 2D sequence of equalized samples are processed using a 2D detector to detect a second estimated data sequence.

16 Claims, 4 Drawing Sheets

(56) References Cited

U.S. PATENT DOCUMENTS

| | | |
|---|---|---|
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,140 B2 | 11/2004 | Brommer et al. |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |

(56) References Cited

U.S. PATENT DOCUMENTS

| | | |
|---|---|---|
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,549 B2 | 9/2006 | Asakura |
| 7,106,947 B2 | 9/2006 | Boyle et al. |
| 7,110,202 B1 | 9/2006 | Vasquez |
| 7,111,116 B1 | 9/2006 | Boyle et al. |
| 7,111,225 B2 | 9/2006 | Coene et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,259,927 B2 | 8/2007 | Harris |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |

(56) References Cited

U.S. PATENT DOCUMENTS

| | | |
|---|---|---|
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,300,339 B1 | 10/2012 | Nangare et al. |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | Deforest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,750 B1 | 5/2013 | Nangare et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,578,253 B2 | 11/2013 | Yang et al. |
| 8,582,223 B1 * | 11/2013 | Garani et al. ................... 360/40 |
| 8,582,231 B1 | 11/2013 | Kermiche et al. |
| 8,589,773 B1 | 11/2013 | Wang et al. |
| 8,593,753 B1 | 11/2013 | Anderson |
| 8,599,508 B1 | 12/2013 | Burd |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,638,513 B1 | 1/2014 | Burd |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 2004/0169946 A1 * | 9/2004 | Uno et al. ........................ 360/39 |
| 2005/0213458 A1 * | 9/2005 | Iwase ......................... 369/53.35 |
| 2006/0015798 A1 * | 1/2006 | Coene et al. .................. 714/795 |
| 2007/0085709 A1 | 4/2007 | Coene et al. |
| 2009/0052293 A1 * | 2/2009 | Conway et al. .............. 369/59.1 |
| 2009/0113702 A1 | 5/2009 | Hogg |
| 2010/0177419 A1 | 7/2010 | Liu et al. |
| 2010/0306551 A1 | 12/2010 | Meyer et al. |
| 2011/0226729 A1 | 9/2011 | Hogg |
| 2012/0063022 A1 | 3/2012 | Mathew et al. |
| 2012/0105994 A1 | 5/2012 | Bellorado et al. |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0027801 A1 | 1/2013 | Kumar et al. |
| 2013/0223199 A1 | 8/2013 | Lund et al. |
| 2014/0185421 A1 * | 7/2014 | Nakamura et al. ............ 369/103 |

OTHER PUBLICATIONS

Alvin J. Wang, et al., U.S. Appl. No. 14/178,155, filed Feb. 11, 2014, 25 pages.

Yiming Chen, et al., U.S. Appl. No. 13/968,323, filed Aug. 15, 2013, 19 pages.

S. Nabavi, B. V. K. V. Kumar, "Two-Dimensional Generalized Partial Response Equalizer for Bit-Patterned Media," IEEE Trans. Magn., vol. 44, No. 11, pp. 6249-6254, Nov. 2008.

(56) References Cited

OTHER PUBLICATIONS

K.S. Chan, R. Radhakrishnan, K. Eason, R. M. Elidrissi, J. Miles, B. Vasic and A. R. Krishnan, "Channel Models and Detectors for Two-Dimensional Magnetic Recording (TDMR)," IEEE Trans. Magn., vol. 46, No. 3, Mar. 2010.

Yunxiang Wu, Joseph A. O'Sullivan, Naveen Singla, and Ronald S. Indeck, "Iterative Detection and Decoding for Separable Two-Dimensional Intersymbol Interference," IEEE Transactions on Magnetics, vol. 39, No. 4, Jul. 2003, pp. 2115-2120.

T. Losuwan, C. Warisarn, P. Supnithi, and P. Kovintavewat, "A Study of 2D detection for Two-Dimensional Magnetic Recording," in Proc. of ITC-CSCC 2012, Jul. 15-18, 2012, Sapporo, Japan.

\* cited by examiner

DATA STORAGE DEVICE EMPLOYING ONE-DIMENSIONAL AND TWO-DIMENSIONAL CHANNELS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to data sectors within a data track by modulating the write current of a write element, for example, using a non-return to zero (NRZ) signal, thereby writing magnetic transitions onto the disk surface. A read element (e.g., a magnetoresistive (MR) element) is then used to transduce the magnetic transitions into a read signal that is demodulated by a read channel. The recording and reproduction process may be considered a communication channel, wherein communication demodulation techniques may be employed to demodulate the read signal.

DETAILED DESCRIPTION

Figure 1:
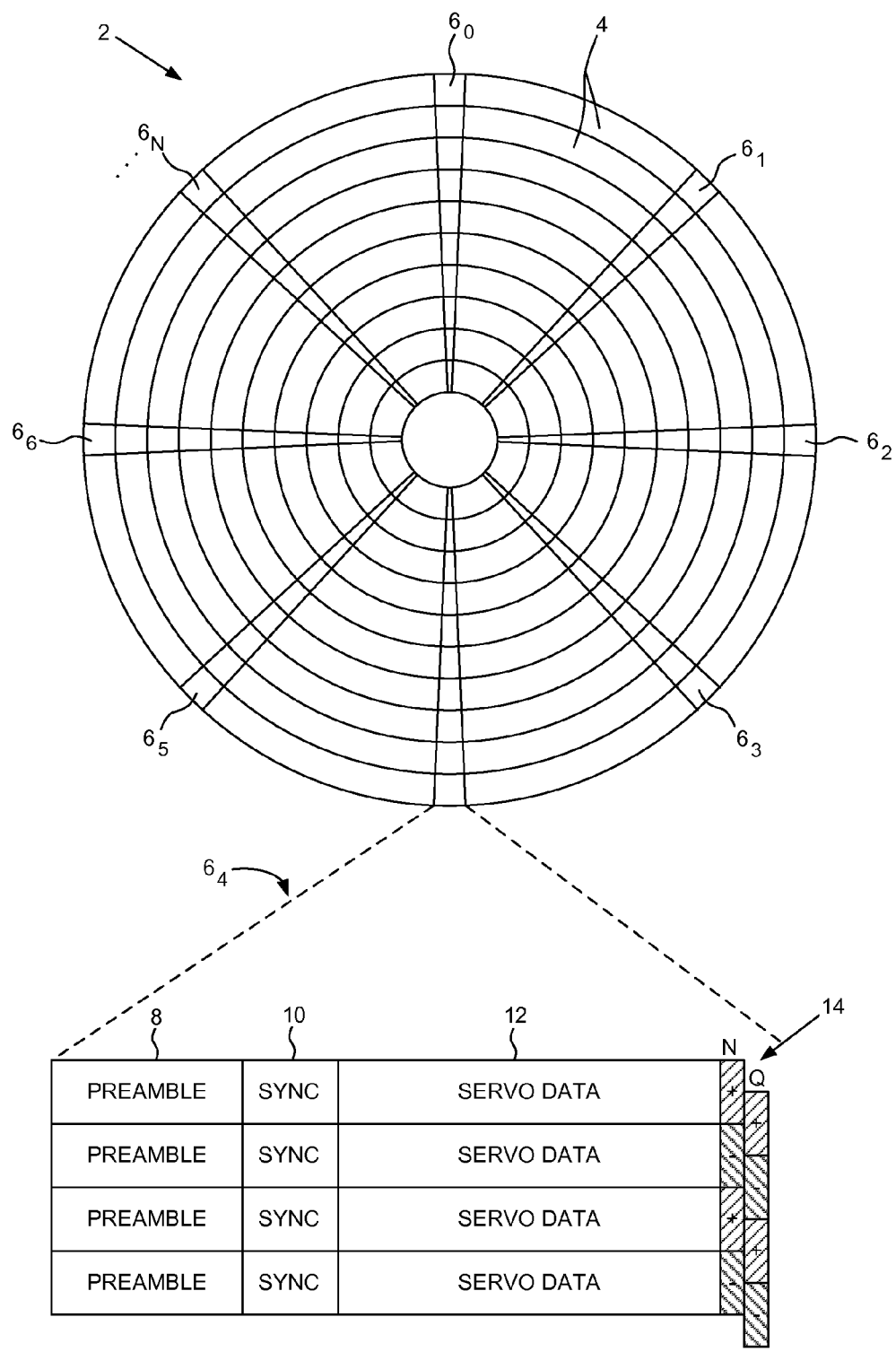
FIG. 1 shows a prior art disk format comprising a plurality of servo tracks defined by servo sectors.
Figure 2A:
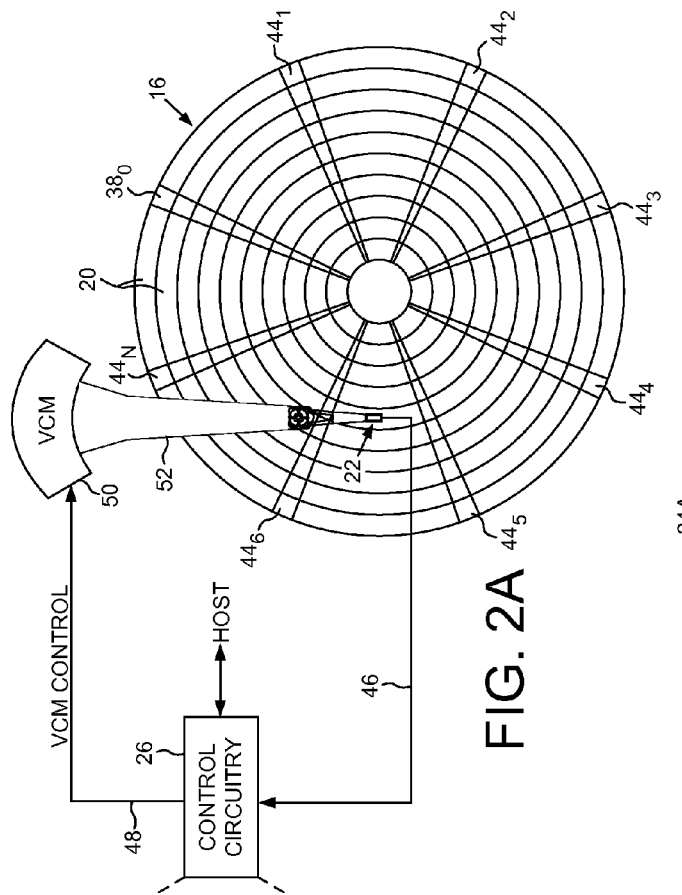
FIG. 2A shows a data storage device in the form of a disk drive according to an embodiment comprising a head actuated over a disk comprising a plurality of data tracks.
Figure 2B:
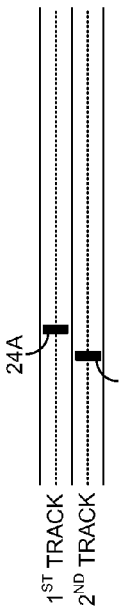
FIG. 2B shows an embodiment wherein the head comprises a first read element positioned over a fist data track and a second read element positioned over a second data track.
Figure 2C:
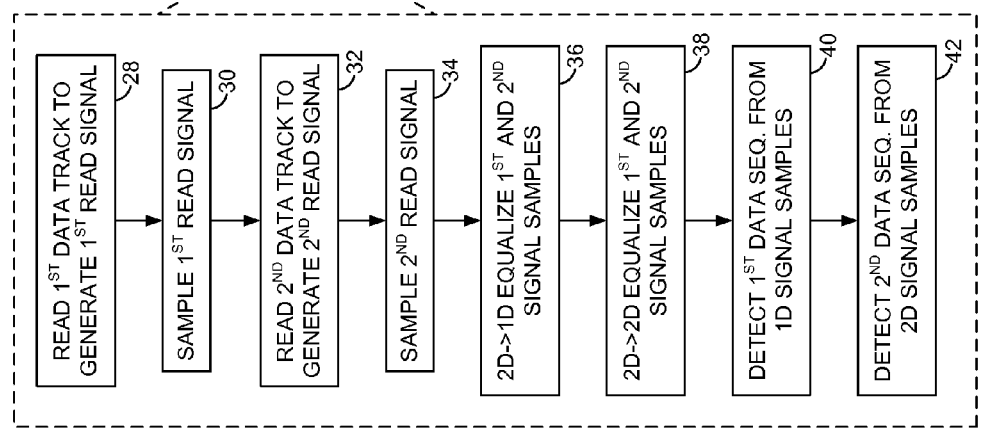
FIG. 2C shows a flow diagram according to an embodiment wherein the signal samples are processed by a 2D-to-1D equalizer and the equalized samples processed by a 1D detector, and by a 2D-to-2D equalizer and the equalized samples processed by a 2D detector.

FIG. 2A shows a data storage device in the form of a disk drive according to an embodiment comprising a disk 16 comprising a plurality of data tracks 20, and a head 22 actuated over the disk 16, the head 22 comprising a plurality of read elements including a first read element 24A and a second read element 24B (FIG. 2B). The disk drive further comprises control circuitry 26 configured to execute the flow diagram of FIG. 2C, wherein a first data track is read using the first read element to generate a first read signal (block 28), and the first read signal is sampled to generate first signal samples (block 30). A second data track adjacent the first data track is read using the second read element to generate a second read signal (block 32), and the second read signal is sampled to generate second signal samples (block 34). The first signal samples and the second signal samples are processed using a first two-dimensional (2D) to one-dimensional (1D) equalizer to generate a first 1D sequence of equalized samples (block 36), and the first signal samples and the second signal samples are processed using a 2D-to-2D equalizer to generate a 2D sequence of equalized samples (block 38). The first 1D sequence of equalized samples are processed using a first 1D detector to detect a first estimated data sequence (block 40), and the 2D sequence of equalized samples are processed using a 2D detector to detect a second estimated data sequence (block 42).

In the embodiment of FIG. 2A, a plurality of concentric servo tracks are defined by embedded servo sectors $44_0$-$44_N$, wherein the data tracks 20 are defined relative to the servo tracks at the same or different radial density. The control circuitry 26 processes at least one read signal 46 emanating from the head 22 to demodulate the servo sectors and generate a position error signal (PES) representing an error between the actual position of the head and a target position relative to a target track. The control circuitry 26 filters the PES using a suitable compensation filter to generate a control signal 48 applied to a voice coil motor (VCM) 50 which rotates an actuator arm 52 about a pivot in order to actuate the head 22 radially over the disk 16 in a direction that reduces the PES. The servo sectors $44_0$-$44_N$ may comprise any suitable head position information, such as a track address for coarse positioning and servo bursts for fine positioning. The servo bursts may comprise any suitable pattern, such as an amplitude based servo pattern or a phase based servo pattern.

Figure 3:
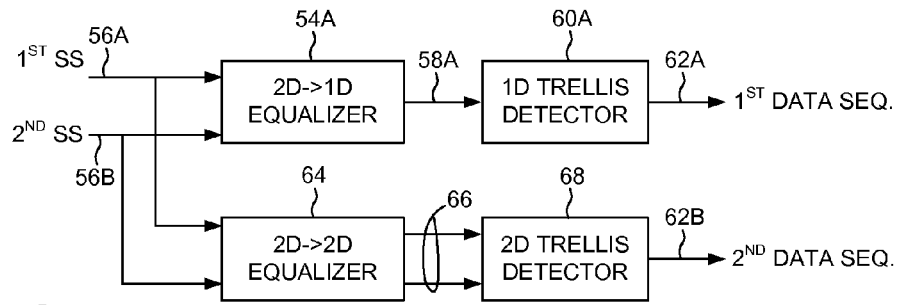
FIG. 3 shows an embodiment wherein the 1D detector comprises a trellis type detector and the 2D detector comprises a trellis type detector.

FIG. 3 shows control circuitry according to an embodiment comprising a first 2D-to-1D equalizer 54A that processes the signal samples 56A and 56B generated by sampling the first and second read signals to generate a first 1D sequence of equalized samples 58A processed by the first 1D detector 60A. In one embodiment, the first 2D-to-1D equalizer 54A filters the signal samples 56A and 56B so as to reduce inter-track interference (ITI) in the first signal samples 56A caused by the data recorded in the second data track. In this manner, the first 1D sequence of equalized samples 58A may comprise a controlled amount of down-track interference (referred to as inter-symbol interference (ISI)) corresponding to a target response of the channel (e.g., target partial response (PR)). The controlled amount of ISI is taken into account by the 1D detector 60A when detecting the first data sequence 62A. The embodiment of FIG. 3 also comprises a 2D-to-2D equalizer 64 that processes the signal samples 56A and 56B generated by sampling the first and second read signals to generate a 2D sequence of equalized samples 66 processed by the 2D detector 68. In one embodiment, the 2D-to-2D equalizer 64 filters the signal samples 56A and 56B so as to achieve a controlled amount of ITI as well as a controlled amount of ISI corresponding to a target response. The controlled amount of ITI and ISI is taken into account by the 2D detector 68 when detecting the second data sequence 62B. Any suitable 1D detector 60A and any suitable 2D detector 68 may be employed, wherein in the embodiment of FIG. 3 each detector comprise a suitable trellis type detector, such as a suitable Bahl, Cocke, Jelinek and Raviv (BCJR) detector, such as a turbo code detector or a low-density parity-check (LDPC) detector.

As described below with reference to FIG. 6, the control circuitry shown in the embodiment of FIG. 3 may exhibit better performance than a conventional disk drive employing two 2D-to-2D equalizers and two 2D detectors (one for each data track). In another embodiment, the control circuitry shown in the embodiment of FIG. 3 may exhibit better performance when one of the read elements is wider than the other read element. For example, if the second read element 24B is wider than the first read element 24A, the performance may improve by having a 2D-to-1D equalizer 54A reduce ITI in the first signal sample 56A and by having a 2D-to-2D equalizer 64 shape the ITI in both of the signal samples 56A and 56B based on the target response. That is, performance may be improved when a narrow read element is processed using a 1D channel and a wide read element is processed using a 2D channel. Accordingly, in one embodiment the control circuitry 26 may be configured to measure the width of each read element using any suitable technique, and then configure the channels for processing each data track based on the measured width of each read element.

Figure 4:
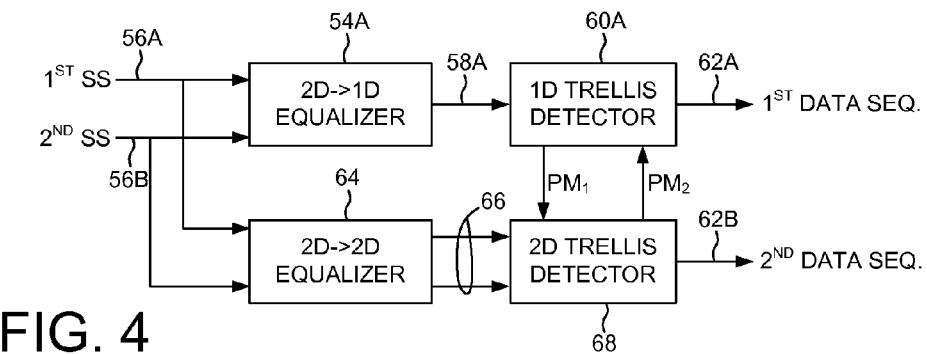
FIG. 4 shows an embodiment wherein the 1D detector processes probability metrics generated by the 2D detector, and the 2D detector processes probability metrics generated by the 1D detector.

FIG. 4 shows control circuitry according to an embodiment wherein the first 1D detector 60A is configured to generate first probability metrics PM1 associated with the first estimated data sequence 62A, and the 2D detector 68 is configured to process the first probability metrics PM1 to detect the second estimated data sequence 62B. In one embodiment, the 2D detector is also configured to generate second probability metrics PM2 associated with the second estimated data sequence 62B, and the first 1D detector 60A is configured to process the second probability metrics PM2 to detect the first estimated data sequence 62A. The data detectors may generate any suitable probability metrics, such as a log-likelihood ratio (LLR) generated by a LDPC detector. In one embodiment, the first 1D detector 60A and the 2D detector 68 are configured to iterate on the probability metrics PM1 and PM2 at least once, for example, until the reliability of the detected data sequences 62A and 62B achieves a target threshold (or the operation aborts as a failure). In one embodiment, the first probability metrics PM1 and the second probability metrics PM2 are substantially uncorrelated due to the 2D-to-1D equalization of the 1D channel, and the 2D-to-2D equalization of the 2D channel. As described below with reference to FIG. 6, reducing the correlation between the first probability metrics PM1 and the second probability metrics PM2 may improve the accuracy of the detected data sequences in terms of bit error rate (BER).

In one embodiment, the control circuitry may be configured to switch the inputs of the 1D channel and the 2D channel during a retry operation. For example, in one embodiment the signal samples 56A of the first read signal may be input into the 2D-to-1D equalizer 54A and the signal samples 56B of the second read signal may be input into the 2D-to-2D equalizer 64 as shown in FIG. 3. If either or both of the first data sequences 62A and 62B are unrecoverable, the control circuitry may switch the inputs such that the signal samples 56B of the second read signal are input into the 2D-to-1D equalizer 54A and the signal samples 56A of the first read signal are input into the 2D-to-2D equalizer 64. In this manner, after switching the inputs a previously unrecoverable data sequence may become recoverable due to the difference in equalization and data detection algorithms. In one embodiment, if only one of the data sequences 62A and 62B is recoverable using an initial configuration for the inputs, the corresponding probability metrics for each bit of the recovered data sequence may be stored in a buffer. After switching the inputs, the previously unrecovered data sequence may be recovered using the buffered probability metrics of the previously recovered data sequence.

Figure 5A:
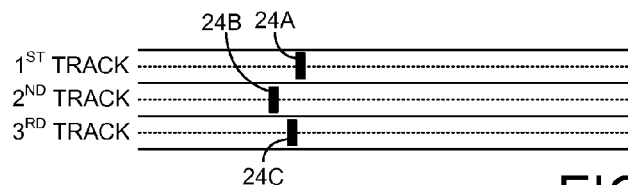
FIG. 5A shows an embodiment where the head comprises a third read element positioned over a third data track.
Figure 5B:
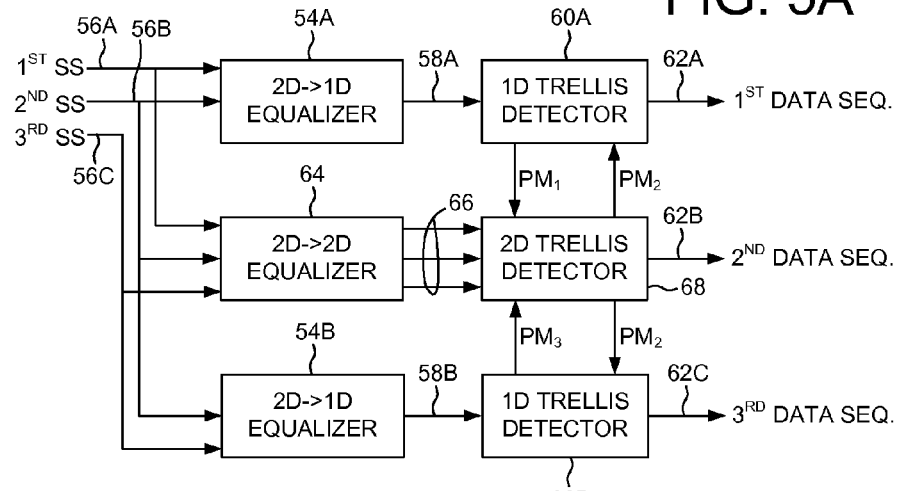
FIG. 5B shows an embodiment wherein the signal samples of the second and third data tracks are processed by a second 2D-to-1D equalizer and the equalized samples processed by a second 1D detector.

FIG. 5A shows an embodiment wherein the head 22 comprises a third read element 24C positioned over a third data track adjacent the second data track. The third data track is read using the third read element 26C to generate a third read signal, and the third read signal is sampled to generate third signal samples 56C (FIG. 5B). The third signal samples 56C and the second signal samples 56B are processed using a second 2D-to-1D equalizer 54B to generate a second 1D sequence of equalized samples 58B processed by a second 1D detector 60B to detect a third estimated data sequence 62C. The first signal samples 56A, the second signal samples 56B, and the third signal samples 56C are processed using the 2D-to-2D equalizer 64 to generate the 2D sequence of equalized samples 66 processed by the 2D detector 68. Similar to the embodiments described above, the inputs to the 1D and 2D channels may be switched during a retry operation if any one of the estimated data sequences 62A, 62B and 62C are unrecoverable.

Figure 6:
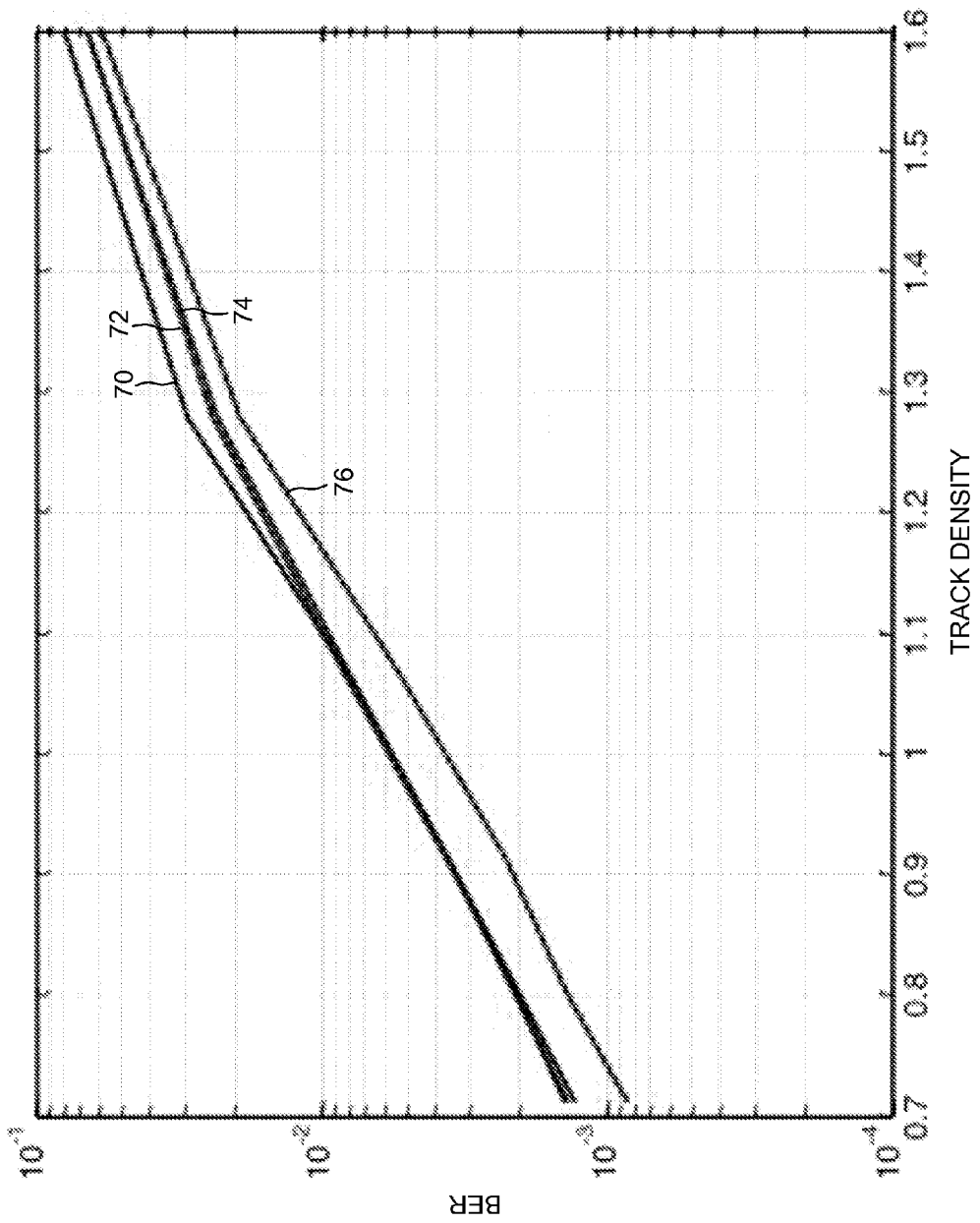
FIG. 6 illustrates the bit error rate (BER) performance versus track density for an embodiment of the present invention as compared to the prior art.

FIG. 6 shows a simulated performance in terms of bit error rate (BER) relative to track density when comparing different channel configurations to the channel configuration shown in the embodiment of FIG. 4. The graph 70 corresponds to a single 1D channel comprising a 1D equalizer and a 1D detector, the graph 72 corresponds to a single 2D channel comprising a 2D-to-2D equalizer and a 2D detector, the graph 74 corresponds to two 2D channels each comprising a 2D-to-2D equalizer and two 2D detectors that pass probability metrics to one another, and the graph 76 corresponds to the 1D channel and 2D channel configuration shown in FIG. 4. FIG. 6 shows the performance comparisons of a simulated recording channel and confirms that a 1D channel and 2D channel such as shown in FIG. 4 can outperform a more complex and more expensive two 2D channel. In one embodiment, the performance improvement of a 1D channel and 2D channel such as shown in FIG. 4 stems from a reduced correlation between the first probability metrics PM1 generated by the 1D detector 60A and the second probability metrics PM2 generated by the 2D detector 68.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

While the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:
1. A data storage device comprising:
a disk comprising a plurality of data tracks;
a head actuated over the disk, the head comprising a plurality of read elements including a first read element and a second read element; and
control circuitry configured to:
read a first data track using the first read element to generate a first read signal;
sample the first read signal to generate first signal samples;
read a second data track adjacent the first data track using the second read element to generate a second read signal;
sample the second read signal to generate second signal samples;
process the first signal samples and the second signal samples using a first two-dimensional (2D) to one-dimensional (1D) equalizer to generate a first 1D sequence of equalized samples;
process the first signal samples and the second signal samples using a 2D-to-2D equalizer to generate a 2D sequence of equalized samples;
process the first 1D sequence of equalized samples using a first 1D detector to detect a first estimated data sequence; and
process the 2D sequence of equalized samples using a 2D detector to detect a second estimated data sequence.

2. The data storage device as recited in claim 1, wherein the second read element is wider than the first read element.

3. The data storage device as recited in claim 1, wherein:
the first 1D detector is configured to generate first probability metrics associated with the first estimated data sequence; and
the 2D detector is configured to process the first probability metrics to detect the second estimated data sequence.

4. The data storage device as recited in claim 3, wherein:
the 2D detector is configured to generate second probability metrics associated with the second estimated data sequence; and
the first 1D detector is configured to process the second probability metrics to detect the first estimated data sequence.

5. The data storage device as recited in claim 4, wherein the first 1D detector and the 2D detector are configured to iterate on the probability metrics at least once.

6. The data storage device as recited in claim 4, wherein the first probability metrics and the second probability metrics are substantially uncorrelated.

7. The data storage device as recited in claim 1, wherein:
the first 1D detector comprises a trellis type detector; and
the 2D detector comprises a trellis type detector.

8. The data storage device as recited in claim 1, wherein the head comprises a third read element and the control circuitry is further configured to:
read a third data track adjacent the second data track using the third read element to generate a third read signal;
sample the third read signal to generate third signal samples;
process the third signal samples and the second signal samples using a second 2D-to-1D equalizer to generate a second 1D sequence of equalized samples;
process the first signal samples, the second signal samples, and the third signal samples using the 2D-to-2D equalizer to generate the 2D sequence of equalized samples; and process the second 1D sequence of equalized samples using a second 1D detector to detect a third estimated data sequence.

9. A method of operating a data storage device, the method comprising:
reading a first data track using a first read element to generate a first read signal;
sampling the first read signal to generate first signal samples;
reading a second data track adjacent the first data track using a second read element to generate a second read signal;
sampling the second read signal to generate second signal samples;
processing the first signal samples and the second signal samples using a first two-dimensional (2D) to one-dimensional (1D) equalizer to generate a first 1D sequence of equalized samples;
processing the first signal samples and the second signal samples using a 2D-to-2D equalizer to generate a 2D sequence of equalized samples;
processing the first 1D sequence of equalized samples using a first 1D detector to detect a first estimated data sequence; and
processing the 2D sequence of equalized samples using a 2D detector to detect a second estimated data sequence.

10. The method as recited in claim 9, wherein the second read element is wider than the first read element.

11. The method as recited in claim 9, further comprising:
the first 1D detector generating first probability metrics associated with the first estimated data sequence; and
the 2D detector processing the first probability metrics to detect the second estimated data sequence.

12. The method as recited in claim 11, further comprising:
the 2D detector generating second probability metrics associated with the second estimated data sequence; and
the first 1D detector processing the second probability metrics to detect the first estimated data sequence.

13. The method as recited in claim 12, further comprising the first 1D detector and the 2D detector iterating on the probability metrics at least once.

14. The method as recited in claim 12, wherein the first probability metrics and the second probability metrics are substantially uncorrelated.

15. The method as recited in claim 9, wherein:
the first 1D detector comprises a trellis type detector; and
the 2D detector comprises a trellis type detector.

16. The method as recited in claim 9, further comprising:
reading a third data track adjacent the second data track using a third read element to generate a third read signal;
sampling the third read signal to generate third signal samples;
processing the third signal samples and the second signal samples using a second 2D-to-1D equalizer to generate a second 1D sequence of equalized samples;
processing the first signal samples, the second signal samples, and the third signal samples using the 2D-to-2D equalizer to generate the 2D sequence of equalized samples; and
processing the second 1D sequence of equalized samples using a second 1D detector to detect a third estimated data sequence.

* * * * *